United States Patent [19]
Dubuit

[11] Patent Number: 5,361,694
[45] Date of Patent: Nov. 8, 1994

[54] INTERCHANGEABLE PRINTHEAD PRINTING MACHINE

[75] Inventor: Jean-Louis Dubuit, Paris, France

[73] Assignee: Societe D'Exploitation des Machines Dubuit, Noisy Le Grand, France

[21] Appl. No.: 28,931

[22] Filed: Mar. 8, 1993

[30] Foreign Application Priority Data

Mar. 26, 1992 [FR] France ................ 92 03636

[51] Int. Cl.⁵ ................................ B41F 15/04
[52] U.S. Cl. ...................... 101/115; 101/123; 400/149
[58] Field of Search ............... 101/115, 123, 126, 127, 101/127.1, 128, 128.1, 129; 400/149

[56] References Cited

U.S. PATENT DOCUMENTS

| | | | |
|---|---|---|---|
| 2,690,118 | 9/1954 | Schwartz et al. | 101/115 |
| 2,739,529 | 3/1956 | Fernandez | 101/115 |
| 3,137,230 | 6/1964 | Ichinose | 101/115 |
| 3,427,964 | 2/1969 | Vasilantone | 101/115 |
| 4,084,505 | 4/1978 | Ichinose | 101/123 |
| 4,173,928 | 11/1979 | Mitter | 101/126 |
| 4,195,567 | 4/1980 | Mitter | 101/123 |
| 4,307,662 | 12/1981 | Mitter | 101/123 |
| 4,669,378 | 6/1987 | Lee | 101/115 |
| 5,020,430 | 6/1991 | Harpold et al. | 101/126 |
| 5,031,527 | 7/1991 | Erpinger | 101/115 |
| 5,090,311 | 2/1992 | Brasa | 101/115 |
| 5,136,938 | 8/1992 | Pellegrina | 101/115 |
| 5,154,119 | 10/1992 | Fuqua et al. | 101/115 |

FOREIGN PATENT DOCUMENTS

| | | | |
|---|---|---|---|
| 496697 | 10/1950 | Belgium | 101/115 |
| 461971 | 12/1949 | Canada | 101/115 |
| 2365440 | 4/1978 | France . | |
| 1460782 | 3/1969 | Germany | 101/115 |
| 306511 | 3/1930 | United Kingdom | 101/115 |
| 637812 | 5/1947 | United Kingdom | 101/115 |
| 2212105 | 7/1989 | United Kingdom | 101/115 |

Primary Examiner—Eugene H. Eickholt
Attorney, Agent, or Firm—Young & Thompson

[57] ABSTRACT

A printing machine comprises a print line along which at least one object support can move and a printhead overlying said print line at at least one printing station and twinned with another printhead disposed on standby away from said print line and with which it is interchangeable.

16 Claims, 3 Drawing Sheets

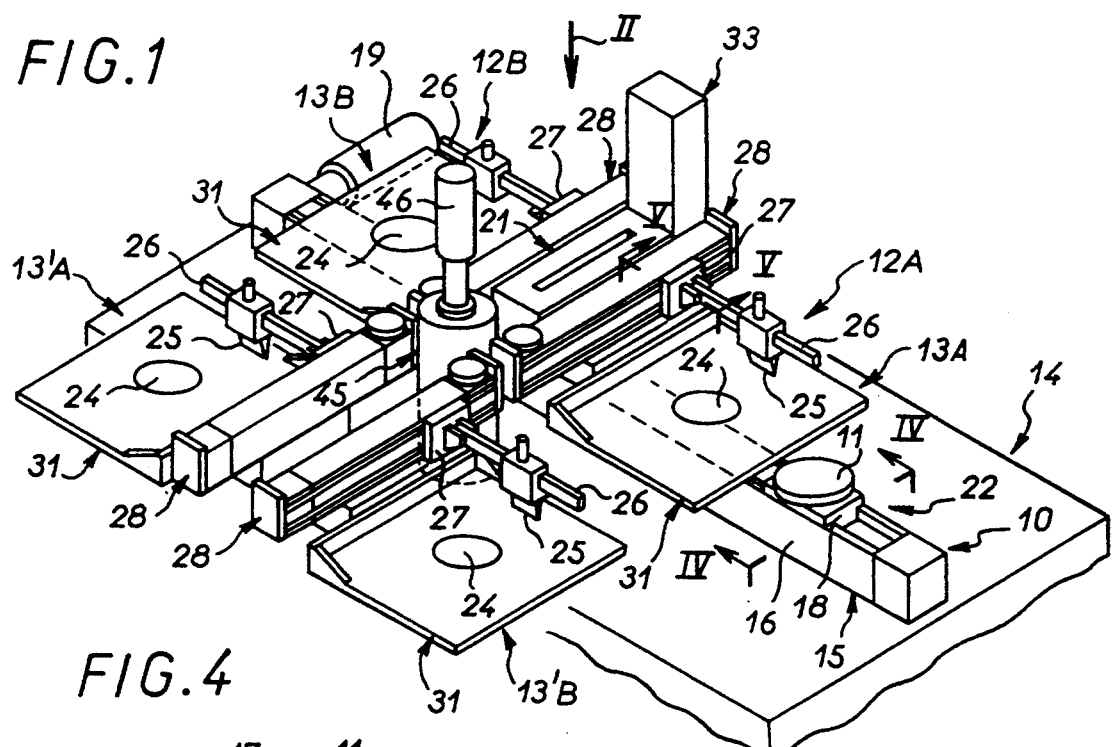
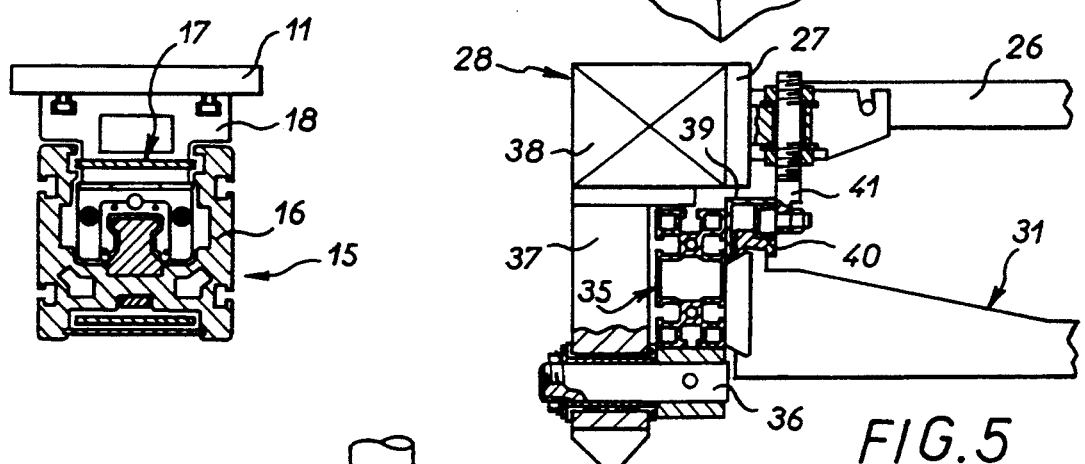
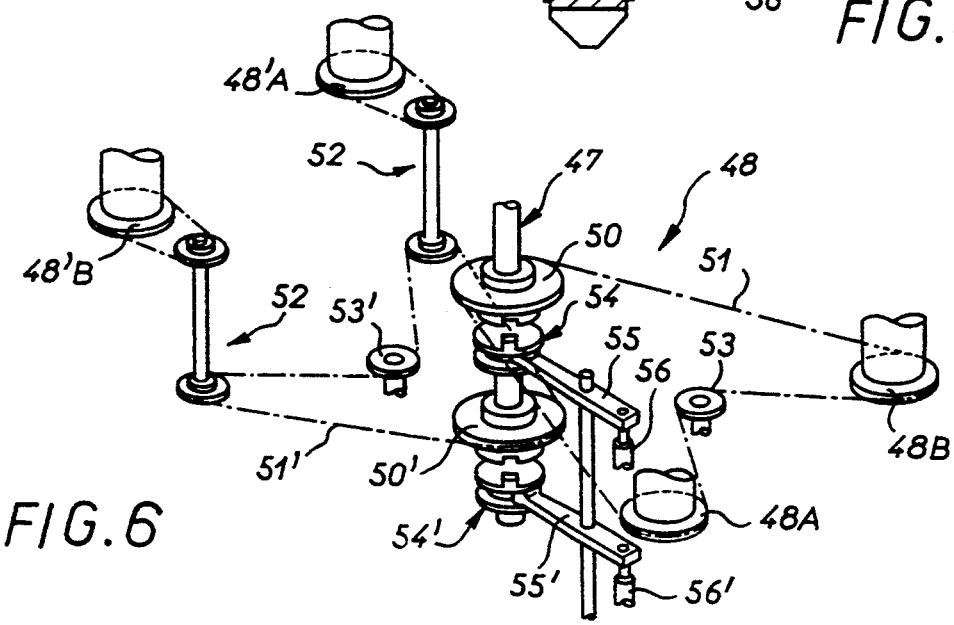

5,361,694

INTERCHANGEABLE PRINTHEAD PRINTING MACHINE

BACKGROUND OF THE INVENTION

1. Field of the Invention

The present invention concerns printing machines in which at least one object support moves along a print line and having a printhead overlying said print line at at least one printing station.

It is more particularly, but not necessarily exclusively, directed to the situation in which said printhead is a silkscreen printhead comprising a silk screen and a squeegee.

2. Description of the Prior Art

At present the printhead is usually fixed in position.

To change from one print job to another it is therefore necessary to interrupt the print line for the time needed to adapt and adjust the printhead. This is costly and detrimental to productivity.

An object of the present invention is an arrangement whereby this drawback may be avoided.

SUMMARY OF THE INVENTION

The present invention consists in a printing machine comprising a print line along which at least one object support can move and a first printhead overlying said print line at at least one printing station and a second such printhead disposed in a standby position spaced away from said print line and interchangeable with the first printhead.

To change from one print job to another it is then advantageously possible to prepare the printhead for the second job in advance, in time that would otherwise be wasted, with the result that there is plenty of time to carry out the necessary adjustments, this printhead being substituted for that already in service at the appropriate time.

As the time required for this substitution is very short, in cases where it is necessary to halt the print line to carry it out the duration of the halt is advantageously restricted, reducing costs and to the benefit of productivity.

In practise, however, the substitution can itself be carried out in time that would otherwise be wasted between two down times of the print line so that the latter does not need to be halted.

The features and advantages of the invention will emerge from the following description given by way of example with reference to the appended diagrammatic drawings.

BRIEF DESCRIPTION OF THE DRAWINGS

FIG. 1 is a perspective view of a printing machine in accordance with the invention.

FIG. 4 is a partial view of the machine to a larger scale and in transverse cross-section on the line IV—IV in FIG. 1.

FIG. 5 is another partial view of the machine in transverse cross-section on the line V—V in FIG. 1.

FIG. 6 is a perspective view of the transmission system used in the printing machine.

DETAILED DESCRIPTION OF THE INVENTION

Figure 3:
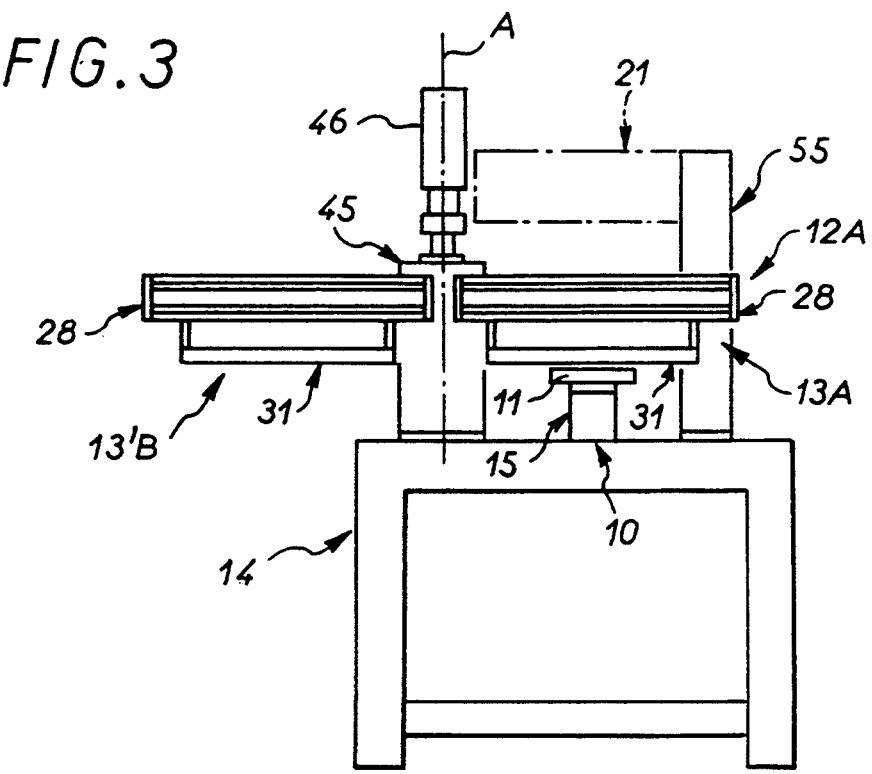
FIG. 3 is a view of the machine in elevation as seen in the direction of the arrow III in FIG. 2.

As shown in the figures this printing machine in accordance with the invention comprises, in a manner that is known in itself, a rectilinear print line 10 along which at least one object support 11 can move with a printhead 13A, 13B, etc overlying said print line 10 at at least one printing station 12A, 12B, etc.

It incorporates, supported by a frame 14, an integrated rail guide device 15 of the type marketed under the trade mark "STAR" by the AIME VIS A BILLES S.A. or under the trade mark "THK".

As an integrated rail guide device 15 of this kind is well known in itself and does not form any part of the present invention it need not be described in great detail here.

Suffice to say that, as shown in FIG. 4, it comprises a rail 16 around which runs an endless belt 17 to the upper run of which a carriage 18 is keyed. Referring to FIG. 1, the belt 17 is driven by a motor 19 which can be controlled in any appropriate manner.

Figure 2:
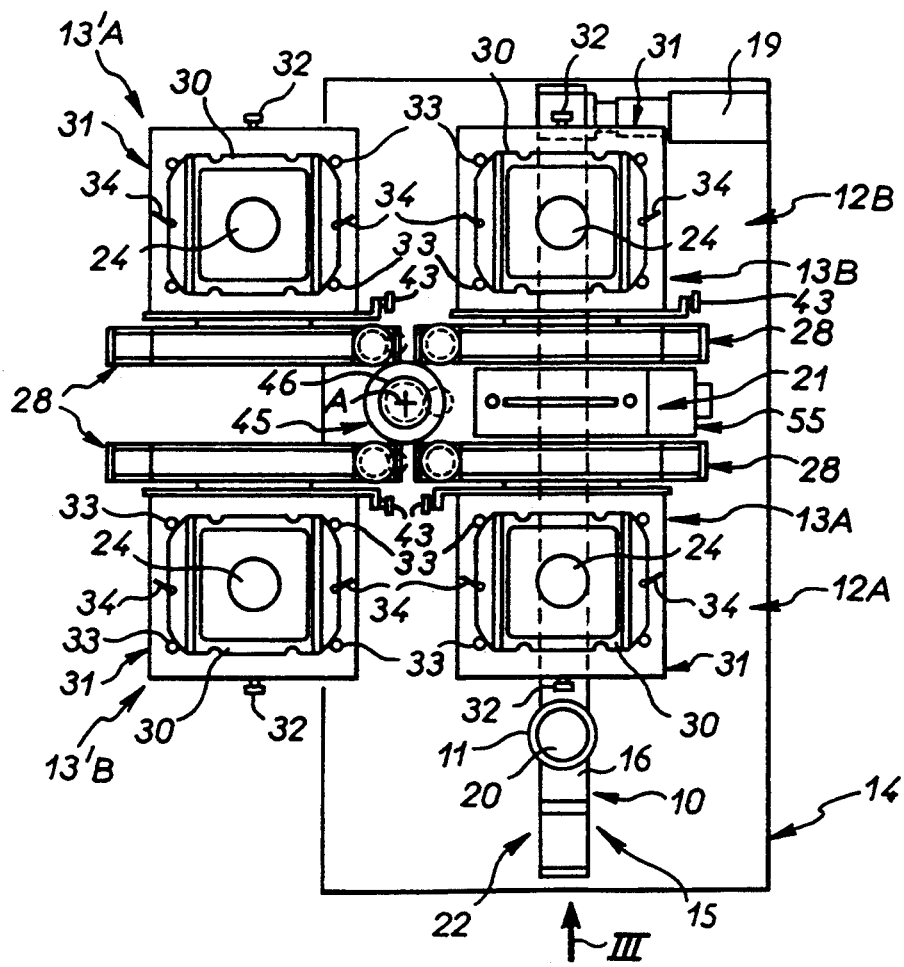
FIG. 2 is a plan view of the machine as seen in the direction of the arrow II in FIG. 1 and with some component parts removed.

The object support 11 has a circular contour in these embodiments because the objects 20 to be printed are compact discs, one of which is shown in FIG. 2. The support 11 is screwed or bolted to the carriage 18, for example.

The (preferably brushless) motor 19 is controlled in such a way as to reciprocate the carriage 18 and therefore the object support 11 along the rail 16, as will be explained in more detail hereinafter.

In this particular printing machine there are only two printing stations 12A, 12B spaced along the print line 10 with a drier unit 21 (an ultraviolet oven, for example) between them.

Starting from a loading and offloading station 22 at one end of the integrated rail guide device 15 and at which, at the start of a printing cycle, an object 20 to be printed is placed on the object support 11, the motor 19 is controlled so that along an outward stroke the object support 11 is halted at the printing station 12A for application of a first color, followed by continuous movement under the drier unit 21, followed by a second halt at the printing station 12B for the application of a second color. The object passes under the drier unit 21 again during the continuous return stroke.

The means for achieving this do not form any part of the present invention and need not be described here.

Likewise the drier unit 21 need not be described here as its construction is well known in itself and does not form any part of the present invention.

In this machine the printheads 13A, 13B are silkscreen printheads.

The illustration of the printheads in FIG. 1 is somewhat schematic.

It is rather more detailed in FIGS. 2, 3 and 5.

The construction of these silkscreen printheads is well known in itself and as it does not form any part of the invention it need be described only in brief here.

The printheads 13A, 13B comprise a screen 24 centered on the axis of the print line 10 and a squeegee 25 mounted above the screen 24 on a squeegee support arm 26 which is mobile relative to the screen 24 in a direction transverse to the print line 10.

The squeegee support arm 26 is attached to the carriage 27 of an integrated rail guide device 28 of the type previously described.

As can be seen more clearly in FIG. 2, the screen 24 is carried by a frame 30 which is attached to a screen support 31.

The position of the frame 30 on the screen support 31 can be adjusted in translation parallel to the axis of the print line 10 by a micrometer screw 32 and in rotation about an axis perpendicular to its plane, in contact with guide pins 33.

The frame 30 can be locked in position on the screen support 31 by means of levers 34.

As can be seen more clearly in FIG. 5, the screen support 31 is attached to a beam 35 pivoting on a stub shaft 36 carried by an upright 37 fastened to the rail 38 of the integrated rail guide device 28 and an angle-iron 39 carried by the beam 35 is guided by a roller 40 carried by an upright 41 fastened to the carriage 27 carrying the squeegee support arm 26.

The position of the screen support 31 on the beam 35 is adjustable perpendicularly to the axis of the print line 10 by a micrometer screw 43 which can be seen in FIG. 2.

According to the invention at least one of the first printheads 13A, 13B (each of them in practice) is associated with another second printhead 13′A, 13′B which is in a standby position around away from the print line 10 and is interchangeable with a corresponding one of the first printheads.

The printheads 13A and 13′A and 13B and 13′B are respectively of the same type.

In other words, the second printheads 13′A, 13′B are also silkscreen printheads with a fixed screen 24 and a squeegee 25 carried by a carriage 27 of an integrated rail guide device 28.

The first and second printheads 13A, 13′A, 13B, 13′B are are preferably carried by a common support 45, as shown here.

In the embodiment shown in FIGS. 1 through 6 the support 45 is a rotatable column at a fixed position alongside the print line 10.

The rotatable column carries, at H, the integrated rail guide devices 28 of the first and second printheads 13A, 13B, 13′A, 13′B and its rotation axis A is perpendicular to the screen 24 of the latter.

Second printhead 13′A is diametrally opposite the corresponding first printhead 13A with which it forms a pair. Likewise the second printhead 13′B is diametrally opposite the first printhead 13B with which it forms a pair.

The integrated rail device 28 of the printhead 13′A is aligned with that of the printhead 13B. Likewise, the integrated rail guide device 28 of the printhead 13′B is aligned with that of the printhead 13A.

Thus two spaced first printheads 13A, 13B are successively provided above the print line 10 and the support 45 carries four (i.e. double the number of) printheads 13A, 13B, 13′A, 13′B grouped in pairs.

The support 45 carries a common motor 46 for driving the carriages 27 carrying the squeegee 25 of each printhead 13A, 13B, 13′A, 13′B. The motor 46 is coupled to the carriages 27 by a transmission 48.

The transmission 48 is shown in FIG. 6 together with a shaft 47 driven by the output shaft of the motor 46.

In brief, the transmission 48 comprises, circumferentially distributed at a common level around the shaft 47, four rotary members 48A, 48B, 48′A, 48′B, one for each of the printheads 13A, 13B, 13′A, 13′B, their arrangement being analogous to that of the printheads.

Each rotary member 48A, 48B, 48′A, 48′B is constrained to rotate with a respective direction-changer device of the belt of the integrated rail guide device 28 of the first and second printheads 13A, 13′A, 13B, 13′B.

These devices are pulley wheels in this example, but they could equally well be sprocket wheels.

The transmission 48 further comprises two master rotary members 50, 50′ of the same type which are freely rotatable on the shaft 47 but prevented from moving in translation relative to the shaft. The rotary member 50 is disposed at the same level as the rotary members 48A, 48B, 48′A, 48′B and drives two of the latter, in this instance the rotary members 48A, 48B associated with the first printheads 13A, 13B, via a belt 51. The rotary member 50′ is at a different level and drives the other two rotary members, in this instance those 48′A, 48′B associated with the second printheads 13′A, 13′B, via a belt 51′ and satellite rotary members 52 extending between the two levels.

At least one of the belts 51, 51′ (each of them in practise) is preferably tensioned by a direction-changer rotary member 53, 53′.

The transmission 48 finally comprises two selectively engageable coupling members 54, 54′ respectively associated with the two master rotary members 50, 50′ and adapted on command to constrain them to rotate with the shaft 47.

The selectively engageable coupling members 54, 54′ are simple claw couplings, for example, constrained to rotate with the shaft 47 along which they can be moved by yokes 55, 55′ driven by actuators 56, 56′.

The practical implementation of a transmission 48 of this kind will be obvious to the man skilled in the art and need not be described in more detail here.

The same applies to the rotational mounting of the support 45 on the frame 14 and to how the integrated rail guide devices 28 of the various printheads 13A, 13B, 13′A, 13′B are fixed to the support 45.

The rotary members 48A, 48B, 48′A, 48′B operate on the lower surface of the integrated rail guide devices 28, for example.

In the embodiment shown in FIGS. 1 through 6 the drier unit 21 is necessarily retractable from a service position shown in continuous line in FIGS. 1 and 2 in which it intersects the path of movement of the first printheads 13A, 13B when the second printheads 13′A, 13′B are substituted for the latter into a standby position away from this path shown in chain-dotted outline in FIG. 3.

To this end the drier unit 21 is supported by and mobile in translation parallel to the rotation axis of the support 45 on an upright 55 carried by the frame 14.

By virtue of the transmission 48 the printheads 13A, 13B which are in service on the print line 10 are operated synchronously, the respective master rotary member 50 being then locked to the shaft 47 by its claw coupling.

The squeegee 25 of one of the first printheads 13A, 13B is swept across its screen 24 in one direction, the printing direction for example, while the squeegee 25 of the other of the first printheads 13B, 13A is swept across its screen 24 in the opposite direction, to collect up excess printing ink, for example.

Also by virtue of the transmission 48 the squeegees 25 of the second printheads 13′A, 13′B on standby can be similarly actuated, the respective master rotary member 50' being to this end also locked to the shaft 47 by its claw coupling.

It is thus advantageously possible to carry out on the printheads 13'A, 13'B which are on standby all the adjustments required for the next printing job.

All that is required to substitute the second printheads 13'A, 13'B for the printheads 13A, 13B is to pivot their common support 45 through 180°.

This can be done by hand or automatically.

In either case the respective positions of the support 45 are preferably appropriately registered by arrangements that will be familiar to the man skilled in the art.

Figure 8:
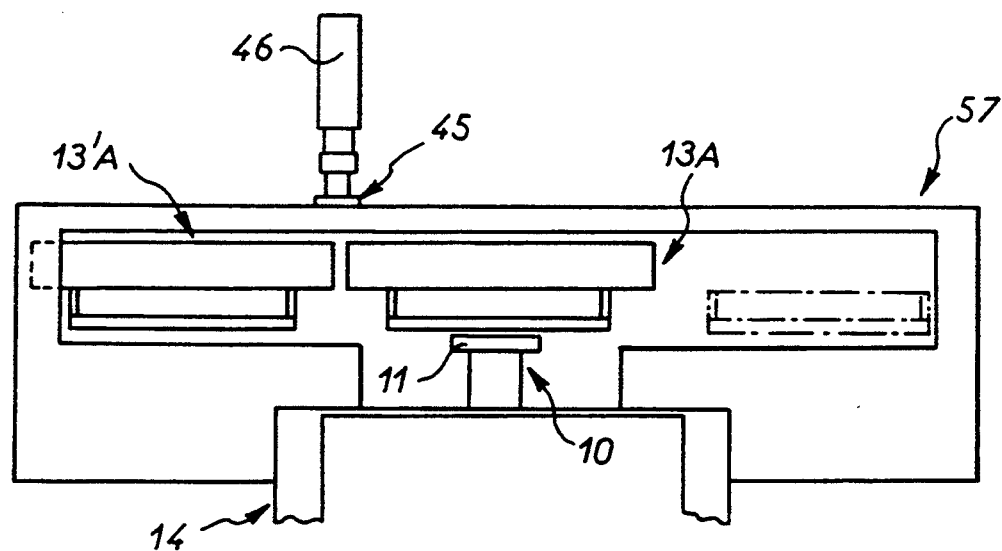
FIGS. 7 and 8 are views respectively analogous to those of FIGS. 2 and 3 but relating to a second embodiment.
Figure 7:
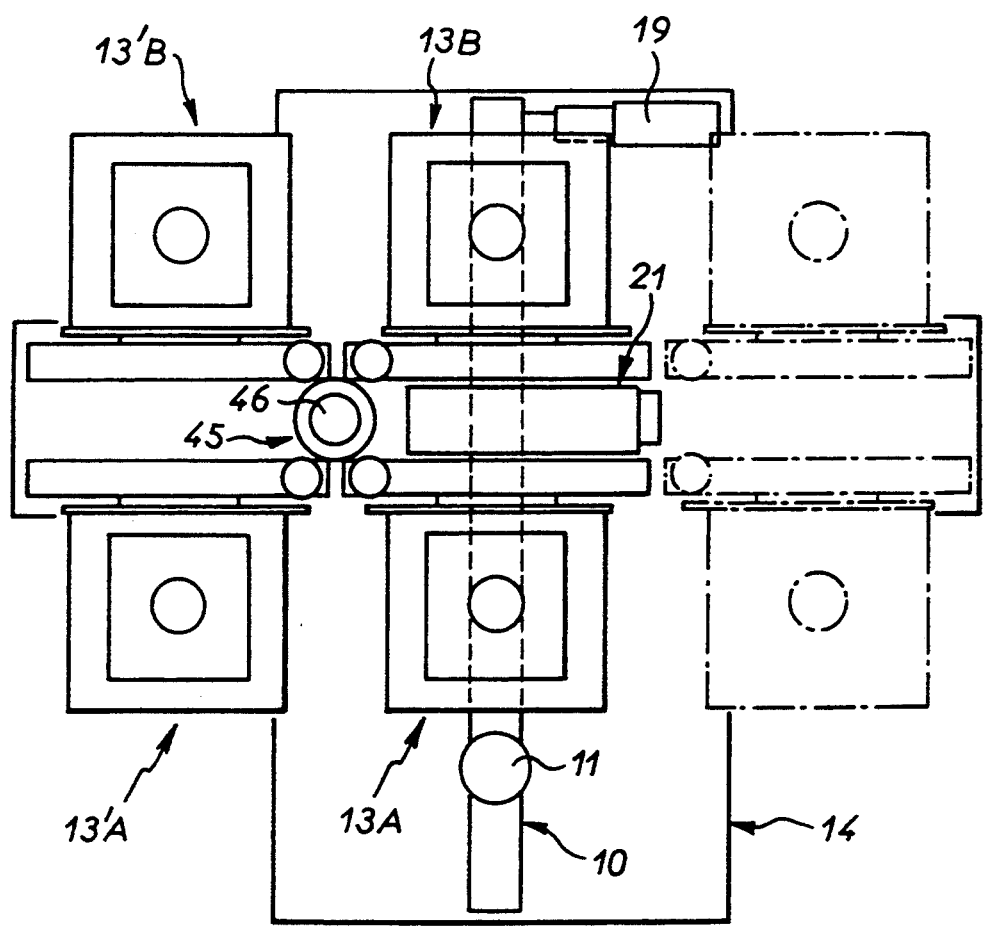

In the second embodiment shown in FIGS. 7 and 8 the support 45 is movable in translation in a direction transverse to the print line 10. To this end it is carried by a gantry 57 in turn carried by the frame 14 and straddling the print line 10. In this case the second printheads 13'A, 13'B associated with the second printheads 13A, 13B are respectively aligned with the latter in the direction perpendicular to the print line and the drier unit 21 may be fixed to the frame 14.

The gantry 57 has been omitted in FIG. 7.

Of course, the present invention is not limited to the embodiments described and shown but encompasses any variant execution thereof.

There is claimed:

1. Printing machine comprising a print line defined by a path of movement of an object support for supporting an object to be printed, a first printhead including a first printing screen and a first squeegee, a second printhead including a second printing screen and a second squeegee, means for effecting relative displacement of a said squeegee and a said screen for printing objects when the corresponding printhead is in a printing position on the print line, means for mounting said printheads for movement between the printing position on the print line and a standby position off said print line, and means for alternately, selectively positioning one of said first and second printheads in its printing position and the other of said first and second printheads in its standby position.

2. Printing machine according to claim 1, wherein said first and second printheads are of substantially the same construction.

3. Printing machine according to claim 1, wherein said means for mounting said first and second printheads comprises a common support carrying said first and second printheads.

4. Printing machine according to claim 3, wherein said means for positioning said first and second printheads comprises rotary drive means located adjacent to said print line.

5. Printing machine according to claim 3, wherein said means for positioning said first and second printheads comprises translatory drive means.

6. Printing machine according to claim 5, wherein said common support is carried by a gantry straddling said print line.

7. Printing machine according to claim 3, wherein said means for selecting relative displacement of said squeegees and screens comprises common motor means, transmission means coupled to said common motor means and drivingly connected to first and second carriages carrying the corresponding first and second squeegees.

8. Printing machine according to claim 1, wherein said first and second printheads define one pair of printheads, further comprising another pair of said first printhead and second printheads of substantially the same construction as said one pair and structurally and functionally interrelated to each other in the same way as said one pair of first and second printheads.

9. Printing machine according to claim 8, wherein a common support carries the both pairs of first and second printheads.

10. Printing machine according to claim 4, wherein said first and second printheads define one pair of printheads, further comprising another pair of said first printhead and second printheads being of substantially the same construction as said one pair and being structurally and functionally interrelated to each other in the same way as the first mentioned pair of first and second printheads, a common support carrying both pairs of said first and second printheads, a rotary means for driving said common support located adjacent said print line, and a drier unit being disposed between first and second printheads above said print line, said drier unit being mounted for movement between an raised, standby position above said print line and a lowered, service position located along the path of movement of said object supports.

11. Printing machine according to claim 10, wherein said drier unit is mounted for translatory movement parallel to the axis of rotation of said common support.

12. Printing machine according to claim 1, wherein the direction of relative displacement of said means for effecting relative displacement of a said squeegee and a said screen of the corresponding printhead in the printing position is perpendicular to the path of movement of the object support.

13. Printing machine according to claim 1, further comprising means for bringing said squeegee into printing relationship with said screen in the printing position on the print line.

14. Printing machine according to claim 1, further comprising said means for effecting relative displacement of a said squeegee and a said screen of the printhead in the standby position for removing excess ink from said screen.

15. A printing machine according to claim 1, wherein the standy position of the printhead is a position for preparing the printhead for subsequent printing when it returns to the printing position on the print line.

16. Printing machine comprising a print line defined by the path of movement of an object support for supporting an object to be printed, a first printhead comprising a first printing screen and a first squeegee, a second printhead comprising a second printing screen and a second squeegee, said means for effecting relative displacement of the squeegee and the screen of a said printhead in a printing position on the print line, means for mounting said printheads for movement between the printing position on the print line and a standby position off said print line, and means for reciprocally positioning one said first and second printheads so that when one of said printhead is in its print position and the other of said first and second printheads in its standby position.

* * * * *